United States Patent
Christensen

[15] 3,697,502
[45] Oct. 10, 1972

[54] METHOD OF MAKING IRON DEXTRAN-PREPARATIONS

[72] Inventor: Henry Marinus Christensen, Frederiksborgvej 107, Ny-Himmelev, 4000 Roskilde, Denmark

[22] Filed: Nov. 3, 1969

[21] Appl. No.: 873,682

[52] U.S. Cl. .............................................. 260/209 D
[51] Int. Cl. .............................................. C08b 25/04
[58] Field of Search .................................. 260/209 D

[56] References Cited

UNITED STATES PATENTS

| | | | |
|---|---|---|---|
| 2,885,393 | 5/1959 | Herb | 260/209 D |
| 3,151,107 | 9/1964 | Heckel et al. | 260/209 D |
| 3,549,614 | 12/1970 | Mioduszewski et al. | 260/209 D |

Primary Examiner—Lewis Gotts
Assistant Examiner—Johnnie R. Brown
Attorney—Erich M. H. Radde

[57] ABSTRACT

A substantially pure iron-dextran preparation is produced by a specific and simple process of reacting ferric chloride and dextran in aqueous solution in the presence of citric acid while maintaining the reaction temperature between about 50° C. and about 100° C. and the pH-value of the reaction mixture at a pH between about 9.0 and 10.0. The resulting iron-dextran preparation is substantially free of chloride ions. The novel process permits the preparation of iron-dextran preparations with a predetermined iron content.

8 Claims, No Drawings

METHOD OF MAKING IRON DEXTRAN-PREPARATIONS

This invention relates to a method of making Iron-Dextran preparations, i.e. consisting partly of iron and partly of a dextran compound selected from the group comprising dextran, more and less depolymerized dextran and dextran derivatives. The preparations in question are suitable for parenteral use in medical — human and veterinary — therapy and they can be used subcutaneously, intramuscularly and intravenously as well.

It is known that Iron-Dextran preparations can be used in the treatment of iron deficiency anemia and can be injected either intramuscularly or subcutaneously. Lately also specially produced preparations have been used for intravenous injection.

The methods hitherto known for producing such preparations have been quite complicated and even when exactly supervising the different production steps and the materials used the resulting preparations have been of very varying character with regard to their content of both iron and dextran. Furthermore, in many cases the production has been time consuming and has been difficult to carry through, mainly due to the fact that during the process an undesirable gelatinizing of ferric hydroxide occurred, especially if the process was carried out under highly alkaline conditions.

The methods used hitherto have often led to unsatisfactory results, as during the coupling process of iron on dextran undesired sedimentation e.g. of ferric hydroxide took place.

The precipitation and purification processes carried out after coupling iron on dextran have been rather complicated and e.g. by processes where dialysis has been used there has been a great possibility of undesired formation of pyrogenic products as the production period was prolonged considerably.

Finally, by the methods used hitherto it has been difficult with certainty to produce an iron dextran preparation in dry form which is very pure as well as easily soluble and wherein the iron content is more than 15 percent calculated on dry material.

Moreover, it has not been possible even when exactly observing the method stages to produce preparations with a predetermined iron content within narrow limits — (+/ 2 percent).

This is important in order to have a possibility of an uncomplicated production of the final forms of medicaments containing iron dextran for human and veterinary use on the base of a well defined homogeneous starting material.

By the present method it is possible to produce completely pure iron dextran preparations also with a predetermined iron content of more than 15 percent and in every case up to 40 percent without the appearance of undesired precipitation or gelatinizing phenomena during the production process.

Moreover, it is possible to carry out the process very fast so that the risk for appearance of pyrogens and bacterial growth is eliminated.

The characteristics of the production method is:

1. employment of a highly purified, ion-free dextran which e.g. corresponds to the purity demands of the Pharmacopeias and has a molecular weight of 3 – 20,000,
2. employment of a very pure ferric chloride,
3. that the process is carried out at a pH between 9 and 10,
4. that coupling of iron to dextran is carried out in the presence of citric acid, by which gelatinizing is avoided,
5. that coupling of iron to dextran is carried out under conditions whereby a pyrogen-free solution of a pure dextran is mixed simultaneous with a ferric chloride solution and a sodium hydroxide solution in such proportions that the pH is kept constantly between 9 and 10, while stirring
6. that the reaction is carried out at 50°– 100° C.

After coupling iron to dextran a clear solution of iron dextran is obtained from which iron dextran is precipitated by the addition of isopropanol while stirring until such a concentration is obtained that practically all iron dextran is precipitated.

Thereafter stirring is discontinued and the supernatant liquid is decanted carefully from the sediment.

The sediment is re-dissolved in ion free, pyrogen-free water, and when the dissolution is complete, the solution is filtered through Seitz EK- and particle filter to achieve a completely bacteria-free, clear solution.

Thereafter the iron dextran is precipitated from the clear solution by means of ethanol while stirring.

When the precipitation is complete, stirring is discontinued. The liquid is decanted and the sediment is washed with concentrated alcohol to half-dryness and it is analyzed for its chloride content - its amount should be minimal.

The last purification step is repeated if necessary, if the chloride content is too high, and the finally precipitated sediment is thereafter dried under vacuum.

EXAMPLE 1

Production of Iron Dextran with 20 percent of Elementary Iron Bound on the Dextran Equipment:
1. a 1.000 liter reaction tank with steam-mantle and stirrer.
2. Containers for ferric chloride solution and sodium hydroxide solution.
3. Filter-Nutsche Sedimentation container with stirrer.
4. Filter-nutsche
5. Vacuum-dryer.
6. Plate Filter, Sparkler type.

Starting Materials
1. Water clear solution of pyrogene-free dextran with an average molecular weight of 7,000 in pyrogene-free distilled water, concentration 16 percent 72 kg. of dextran dissolved in water to a total volume of 450 liters.
2. Ferric chloride solution. 87 kg. $FeCl_3(6H_2O)$ dissolved in about 150 liters of pyrogen-free, distilled, hot water.
3. Sodium hydroxide solution, 34° B, about 115 liters.
4. Citric Acid, 5 kg., B. P.

Method

The dextran solution is heated in the reaction tank under stirring to 90° C. whereafter the citric acid is added and therein. When the citric acid is dissolved, the sodium hydroxide solution being at room temperature is added until the dextran solution is adjusted to a pH between 9 and 10.

When the pH is stable between these limits, the ferric chloride solution and the sodium hydroxide solution are added simultaneously from the two containers, in which the solutions were prepared, into the reaction tank while stirring vigorously. Thereby the speed of flow of the two solutions is regulated so that the pH of the reaction mixture is kept between 9 and 10.

Moreover, the speed of addition should not exceed about 80 liters per hour as far as the ferric chloride solution is concerned.

The temperature of the reaction mixture is controlled during the process and is kept between 80° C. and 90° C.

When the reaction is finished, the resulting solution is colled down to room temperature and the pH is adjusted by the addition of 5N hydrochloric acid to 5.8.

The solution is now transferred to a sedimentation container with stirrer and isopropanol is added, until complete precipitation of iron dextran is obtained.

The liquid is decanted from the sediment. Thereafter the precipitate is dissolved in the same volume of distilled, pyrogen-free water as before precipitation whereby a clear solution is obtained.

2 percent of activated carbon SECA S 3 and about 7 kg. of Hyflo Super Cel are added - while stirring is continued.

The suspension is kept under constant stirring while it is gradually filtered through a plate filter with filter paper and immediately thereafter through another plate filter with Seitz EK filter plates, whereby pyrogen-free, bacteria-free, practically sterile solution is obtained.

The filtered solution is collected in a sedimentation container and precipitated with ethanol until complete precipitation takes place. The supernatant liquid is decanted, and the precipitate is washed a few times with a small quantity of ethanol.

Thereafter the half-dry precipitate is transferred to a filter-nutsche and as much liquid as possible is filtered off by suction after which the half-dry material is dried under vacuum.

The resulting iron dextran has a chloride content of 0.12 percent, is pyrogen-free, and contains 20.1 percent of elementary iron.

EXAMPLE 2

Production of Iron Dextran Glycerol Glycoside containing 20 percent of Elementary Iron Bound on the Dextran For producing this compound, exactly the same method as described in example 1 is used with the only alteration that the starting material is a Dextran Glycerol Glycoside of a molecular weight corresponding to that stated for dextran.

With this starting material a final product is obtained which contains 0.21 percent of chloride and 20.8 percent of elementary iron.

EXAMPLE 3

Production of Iron Dextran containing 36 percent of Elementary Iron Bound on Dextran In this example the procedure is exactly the same as stated in example 1, but the starting materials used are as follows:

1. Water clear solution of pyrogen-free dextran of an average molecular weight of 7,000 in pyrogen-free distilled water,
   concentration 15.8 percent
   79 kg. of dextran dissolved in water to a total volume of 500 liters
2. Ferric chloride solution, 225 kg. $FeCl_3(6H_2O)$ dissolved in about 200 liters of pyrogen-free, distilled, hot water.
3. Sodium hydroxide solution, 34° Be, about 270 liters.
4. Citric Acid, 5 kg. B.P.

The resulting Iron Dextran showed a chloride content of 0.23 percent, was pyrogen-free and contained 35.9 percent of elementary iron.

EXAMPLE 4

Production of Iron Dextran with 15 percent of Elementary Iron Bound on the Dextran In this example the procedure is exactly the same as in example 1, but the starting materials used are as follows:

1. Water clear solution of pyrogen-free dextran of an average molecular weight of 10,000 in pyrogene free distilled water,
   concentration 16 percent:
   88 kg. of dextran dissolved in water to a total volume of 550 liters.
2. Ferric Chloride solutions, 75 kg. $FeCl_3(6H_2O)$ dissolved in about 120 liters of pyrogen-free, distilled, hot water.
3. Sodium hydroxide solution, 34° Be, about 100 liters.
4. Citric Acid, 5 kg. B.P.

The produced iron dextran showed a chloride content of less than 0.1 percent was pyrogen-free and contained 15.3 percent of elementary iron.

The examples described here demonstrate typical manufacturing results.

Employment of Dextran Glycoside as a starting material instead of Dextran has not shown any deviation in the results obtained.

The reason why isopropanol is used for the first precipitation and ethanol for the second precipitation in the examples is that this constellation has appeared to be favorable to obtain a good salt free precipitation and regular final results, but it will be clear to every chemist that other precipitating agents as e.g. methanol or ketones or combinations of such solvents can be used as well to obtain corresponding results.

EXAMPLE 5

Production of Iron Dextran containing 25 percent of Elementary Iron Bound on the Dextran In this example the procedure is exactly the same as in example 1, but the starting materials used are as follows:

1. Water clear solution of pyrogen-free dextran of an average molecular weight of 10,000 in pyrogene free distilled water, concentration 16 percent:
   72 kg. of dextran dissolved in water to a total volume of 450 liters.
2. Ferric Chloride solutions, 116 kg. $FeCl_3(6H_2O)$ dissolved in about 70 liters of pyrogen-free, distilled, hot water.
3. Sodium hydroxide solution, 34° Be, 150 liters.
4. Citric Acid, 5 kg. B. P.

The produced iron dextran showed a chloride content of 0.05 percent, was pyrogen-free and contained 25.1 percent of elementary iron.

EXAMPLE 6

Production of Iron Dextran with 17 percent of Elementary Iron Bound on the Dextran In this example the procedure is exactly the same as in example 1, but the starting materials used are as follows:

1. Water clear solution of pyrogen-free dextran of an average molecular weight of 10,000 in pyrogen-free distilled water, concentration 16 percent:

72 kg. of dextran dissolved in water to a total volume of 450 liters.

2. Ferric Chloride solutions, 71 kg. $FeCl_3(6H_2O)$ dissolved in about 50 liters of pyrogen-free, distilled water (hot).

3. Sodium hydroxide solution, 34° Be, about 95 liters.

4. Citric Acid, 5 kg. B. P.

The resulting iron dextran showed a chloride content of 0.08 percent, was pyrogen-free and contained 17 percent of elementary iron.

What I claim is:

1. In a process of producing an iron-dextran preparation by reacting a dextran and an inorganic ferric salt dissolved in water, the improvement which consists in
   a. adding citric acid to an ion-free solution of a highly purified, pyrogen-free dextran in pyrogen-free distilled water of a temperature between about 50° C. and about 100° C., the amount of citric acid added being between about 72 parts and about 88 parts of dextran for 5 parts of citric acid,
   b. adding an alkali metal hydroxide solution to said mixture in an amount sufficient to adjust the pH-value of the mixture to a pH between about 9.0 and about 10.0,
   c. simultaneously but separately adding a ferric chloride solution and an alkali metal hydroxide solution to said mixture, while maintaining its temperature between about 50° C. and about 100° C. and its pH-value between a pH-value of about 9.0 and about 10.0, and
   d. precipitating the resulting iron-dextran preparation from the reaction mixture.

2. The process of claim 1, in which the precipitated iron-dextran preparation is further purified by dissolving it in pyrogen-free distilled water and reprecipitating the purified iron-dextran preparation.

3. The process of claim 1, in which precipitation of the iron-dextran preparation in step (d) is effected by the addition of isopropanol.

4. The process of claim 2, in which reprecipitation of the iron-dextran preparation is effected by the addition of ethanol.

5. The process of claim 1 in which ethanol is used as the dextran precipitating solvent, the concentration of said solvent in step (a) is increased to about 89 percent, the concentration of said solvent in step (d) is increased to about 95 percent, and the concentration of said solvent in step (e) is reduced by the addition of water to about 89 percent.

6. The process of claim 1, in which the temperature during reaction is kept between about 80° C. and about 90° C.

7. The process of claim 1, in which the dextran reacted with ferric chloride has a molecular weight between about 3,000 and about 20,000.

8. The process of claim 1, in which the dextran reacted with ferric chloride is dextran glycerol glycoside.

* * * * *